L. A. ALEXANDER.
ADJUSTABLE BUSHING.
APPLICATION FILED JAN. 20, 1908.
1,031,410.
Patented July 2, 1912.
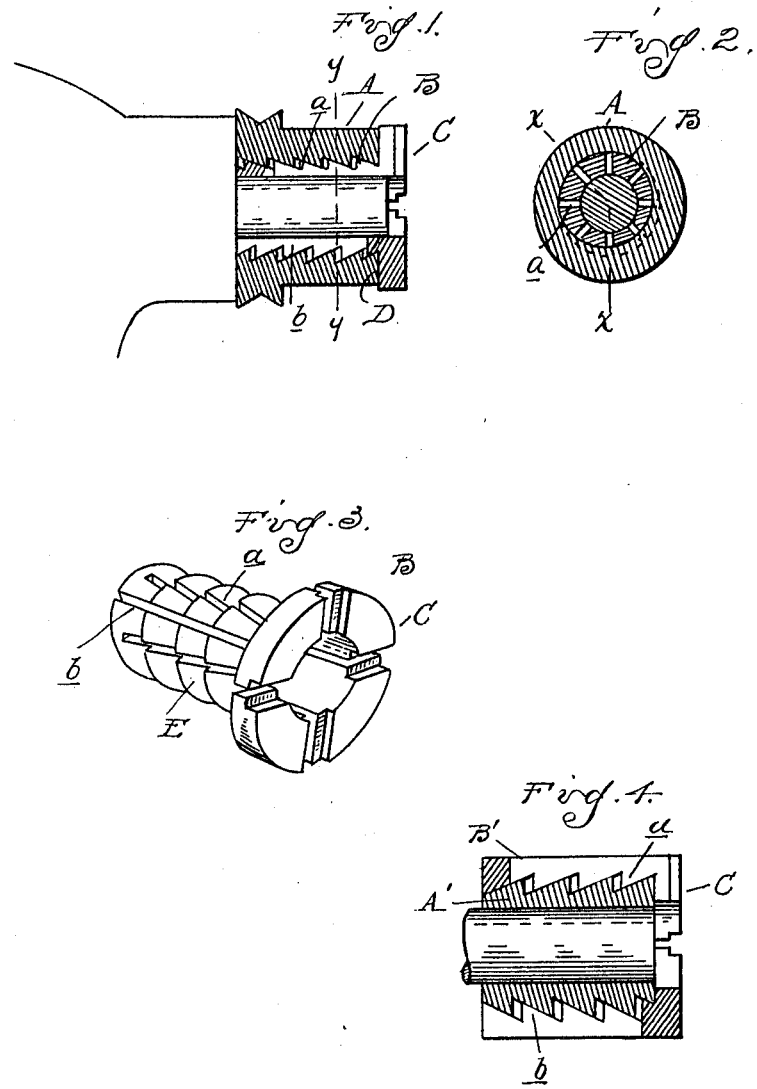

UNITED STATES PATENT OFFICE.

LOUIS A. ALEXANDER, OF TOLEDO, OHIO, ASSIGNOR TO THE F. BISSELL COMPANY, OF TOLEDO, OHIO, A CORPORATION OF OHIO.

ADJUSTABLE BUSHING.

1,031,410.　　　　　Specification of Letters Patent.　　　Patented July 2, 1912.

Application filed January 20, 1908. Serial No. 411,734.

*To all whom it may concern:*

Be it known that I, LOUIS A. ALEXANDER, a citizen of the United States of America, residing at Toledo, in the county of Lucas and State of Ohio, have invented certain new and useful Improvements in Adjustable Bushings, of which the following is a specification, reference being had therein to the accompanying drawings.

It is the object of the invention to provide means for attaching revoluble bodies to shafts or spindles of varying size, and to this end the invention consists in the construction of a self-centering bushing, as hereinafter described.

In the drawings—Figure 1 is a central longitudinal section on line $x$—$x$, Fig. 2. Fig. 2 is a cross section thereof on line $y$—$y$, Fig. 1; Fig. 3 is a perspective view of one of the members of the bushing; and Fig. 4 is a view similar to Fig. 1 showing a modified construction.

My improvement comprises essentially a slitted sleeve or bushing which has a screw threaded engagement with a coöperating unslitted member. The section of the thread is inclined or wedge-shape, and a stop is provided for limiting the longitudinal movement of the sleeve so that the rotation of the latter, in relation to the coöperating member, will cause a radial movement of the sections between the slits, resulting in a contraction or enlargement of the diameter of the sleeve.

As shown in Fig. 1, A is the hub of a member (not further shown) to be attached to a shaft. This hub carries a race-way, as shown at one end, Fig. 1, designed to receive centering and carrying ball bearings.

B is a bushing sleeve, which is longitudinally slitted, preferably by a plurality of slits $a$ and $b$ extending alternately from opposite ends of the bushing for the greater part of the length thereof, leaving only sufficient stock to hold the sections together. At one end the sleeve is provided with a flange or head C, which has a shoulder D for bearing against the face of the hub member A.

E is a spiral thread upon the external surface of the sleeve B, this thread being preferably of wedge-shape section, as illustrated in Fig. 1. The pitch of the thread is preferably such as to provide a plurality of convolutions in the length of the bushing sleeve, and the hub member is provided with a corresponding female thread.

With the construction as described in use the bushing sleeve D may be engaged with the hub and screwed inward until the shoulder C bears against the face of the hub. These members may then be slipped upon the shaft, after which the sleeve B may be further rotated, and as the shoulder D prevents further longitudinal movement of the sleeve, in relation to the hub, this further rotation has the result of the wedging inward of the sections of the sleeve between the slits. By reason of the fact that the sleeve is slitted alternatively from opposite ends, a substantially parallel inward movement of all portions of each section is permitted. Furthermore, the sections of the thread on opposite sides of the sleeve being the same, the bushing will be accurately centered in all of its positions of adjustment.

In Fig. 4 a modified construction is shown, in which the slitted sleeve member B' is arranged outside of the coöperating member A', the construction being otherwise substantially the same as shown in Fig. 1. With this construction, the member A' is fed to the shaft or other member to which it is secured, and the slitted sleeve B' is expansible to fit the bore of the member to be secured to the shaft. The slitted sleeve members B B' are preferably formed of resilient material, so that after being expanded or contracted they will again return to normal size when released.

What I claim as my invention is:

1. An adjustable self-centering bushing comprising two concentrically arranged sleeves engaging each other with a screw thread of wedge-shape section, one of said sleeves being formed of a plurality of connected radially adjustable segments distributed uniformly about the circle, with a plurality of spaces therebetween permitting a relatively large range of radial adjustment for said sections.

2. An adjustable self-centering bushing comprising two concentrically arranged sleeves engaging each other with a screw thread of wedge-shape section, one of said sleeves being formed of a plurality of adjustable segments distributed uniformly about the circle and integrally connected alternately at opposite ends with a plurality of equal width spaces therebetween, said spaces permitting said segments a relatively large range of radial adjustment.

3. An adjustable self-centering bushing comprising two concentrically arranged sleeves engaging each other with a screw thread of wedge-shape section, the inner sleeve being formed of a plurality of radially adjustable segments integrally connected alternately at opposite ends, and having a plurality of equal width spaces therebetween and flanged segments projecting radially from each of said adjustable segments and bearing against the end of the other sleeve.

4. The combination with a shaft, of a rotary member having a hub portion and an adjustable self-centering bushing for said hub portion comprising a sleeve member arranged concentrically with said hub member, each of said members having a screw thread of wedge shape section, the inner member being formed of a plurality of radially adjustable segments integrally connected alternately at opposite ends and having a plurality of equal width spaces therebetween, and flange segments projecting radially from each of said members forming coöperating abutments for the purpose described.

In testimony whereof I affix my signature in presence of two witnesses.

LOUIS A. ALEXANDER.

Witnesses:
FREDERICK BISSELL,
AMOS L. CONN.

Copies of this patent may be obtained for five cents each, by addressing the "Commissioner of Patents, Washington, D. C."